United States Patent [19]

Daniels et al.

[11] 4,453,049

[45] Jun. 5, 1984

[54] ARRANGEMENT FOR SINGLE LINE TESTING

[75] Inventors: William R. Daniels; John S. Young, both of Scottsdale, Ariz.

[73] Assignee: GTE Automatic Electric Inc., Northlake, Ill.

[21] Appl. No.: 445,802

[22] Filed: Dec. 1, 1982

[51] Int. Cl.³ .............................................. H04M 3/26
[52] U.S. Cl. ....................... 179/175.2 R; 179/175.2 B; 179/175.23
[58] Field of Search ................. 179/175.2 R, 175.2 C, 179/175.2 D, 175.2 B, 27 FE, 18 AB, 98, 175.21, 175.23

[56] References Cited

U.S. PATENT DOCUMENTS 3,752,940 8/1973 Santulli et al. ............... 179/175.2 R
3,892,928 1/1975 Casterline et al. ........... 179/175.2 R Primary Examiner—Stafford D. Schreyer
Attorney, Agent, or Firm—Frank J. Bogacz; Peter Xiarhos

[57] ABSTRACT

An arrangement for testing a single subscriber line, which is operationally connected to an electromechanical switching system is shown. Operational service is to be transferred from the electromechanical switching system to a digital switching system. The arrangement provides for isolating subscribers which share common line equipment, for verifying the subscriber's line and its ringing characteristics.

7 Claims, 1 Drawing Figure

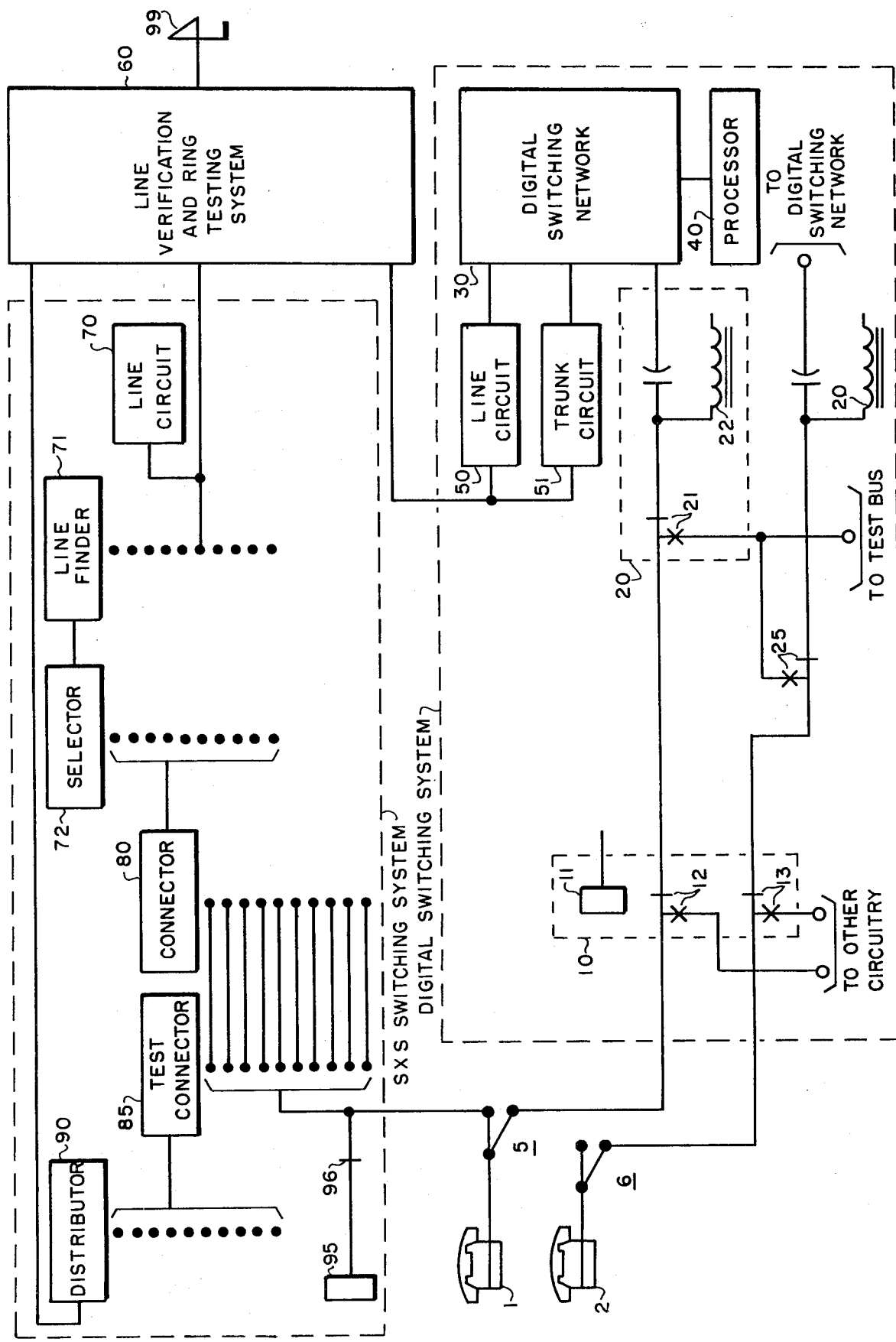

ARRANGEMENT FOR SINGLE LINE TESTING

CROSS-REFERENCE TO RELATED APPLICATIONS

The present application is related to copending U.S. Patent application Ser. Nos. 445,803 and 445,801, having the same inventors and being assigned to the same assignee.

BACKGROUND OF THE INVENTION

The present invention pertains to pre-cutover switching system testing and more particularly to an arrangement for isolation of a single line for line verification and ring testing.

When a new switching system, such as a GTD-5 EAX, is installed to replace an existing switching system such as a step-by-step system, there is a testing interval during which time the subscriber's cables are double jumpered to both switching systems. That is, each subscriber line will have an appearance on an inlet to each switching system. This double jumpering arrangement is made at the main distribution frame.

Without special provisions, the line of each subscriber would be connected to a battery feed device from each switching system. Connection of the subscriber's line to battery feed devices of both switching systems would produce a shunting effect and result in improper signaling and supervisory functions, as well as affecting the quality of voice transmission. Therefore, selective isolation of the subscriber's line from these battery feed devices is highly desirable. During the testing interval, it is also desirable to selectively switch the application of the battery feed signal between the two switching systems.

Accordingly, it is the object of the present invention to isolate particular subscriber lines in a pre-cutover environment for line verification and ring testing.

SUMMARY OF THE INVENTION

An arrangement for single line testing in a pre-cutover switching configuration includes a number of switching system subscribers which will have their operative connection changed from a first switching system to another switching system. At least two switching system subscribers are connected to the first switching system. The first switching system operatively connects these subscribers to one another or to any other switching system subscribers.

The switching system subscribers of the first switching system are simultaneously connected to a second switching system which is in an untested condition. The second switching system includes a switching network connected to the subscribers, a processor complex connected to the switching network and three distinct switching arrangements.

The first switching arrangement is connected to both the first and second switching system subscribers. In the pre-cutover environment, the first switching arrangement is operated to simultaneously open circuit the connection of the first and second subscribers to the switching network. Normally, the first switching arrangement operates to simultaneously maintain the connection of the first and second subscribers to the switching network.

The second and third switching arrangements are each connected between the switching network and the first switching arrangement. The second and third switching arrangements provide for respectively connecting the first and second switching system subscribers to a test interface bus. Normally, the second and third switching arrangements are operated to respectively maintain a connection of the first and second subscribers to the switching network.

Initially, the switching network of the second switching system causes the first switching arrangement to open circuit the first and second subscribers from the second and third switching arrangements respectively.

A testing system is connected to the first switching system and to the switching network of the second switching system for the single line testing arrangement. The testing system requests connection through both the first and second switching systems to the first subscriber. The processor complex of the second switching system operates in response to this request to simultaneously operate the first switching arrangement to connect the first and second subscribers to the switching network and to operate the third switching arrangement to connect the second subscriber to the test interface bus. As a result, the first subscriber is connected to the testing system through the first and second switching arrangements and the switching network of the second switching system.

DESCRIPTION OF THE DRAWINGS

The included drawing FIGURE is a schematic diagram of an arrangement for single line testing in accordance with the principle of operation of the present invention.

DESCRIPTION OF THE PREFERRED EMBODIMENT

Referring to the drawing FIGURE, two telephone subscribers 1 and 2 are shown connected to a step-by-step switching system and to a digital switching system. Subscriber 1 is connected to these switching systems via the double jumper connection 5 and subscriber 2 is connected to both switching systems via the double jumper connection 6. A step-by-step switching system is shown, although this invention may be practiced with other electromechanical switching systems as well (e.g. No. 1 EAX, No. 2 EAX, manufactured by GTE Automatic Electric Incorporated or others). The digital switching system is a time switching system such as, the GTD-5 EAX (manufactured by GTE Automatic Electric Incorporated) or other time division switching systems having similar features of other manufacturers.

Both subscribers 1 and 2 are connected to the digital switching system via relay arrangement 10. Relay arrangement 10 includes relay 11 having make-break contacts 12 and 13 which normally provide for simultaneously connecting both subscribers 1 and 2 to switching network 30. Relay 11 may be operated to transfer the connection of subscribers 1 and 2 to other circuitry instead of the switching network 30.

Subscriber 1 is connected through contacts 12 to line circuit 20. Line circuit 20 includes test relay with make-break contacts 21 and battery feed device 22. Contacts 21 are normally closed to maintain subscriber 1 connected to the switching network 30. Contacts 21 may be operated to enable the line of subscriber 1 to be connected to a test bus for maintenance accesses. Similarly, subscriber 2 may be connected to this test bus via the operation of contacts 25.

The digital switching system includes a processor 40, which is operatively connected to digital switching network 30. Line circuit 50 and trunk circuit 51 are connected to the switching network 30 and provide for connecting subscribers 1 and 2 to other subscribers or to other switching systems. Processor 40 includes a CPU arrangement with a memory containing a data base for operating the switching system. This data base enables the digital switching system to associate particular subscribers with particular line circuits and other equipment.

The digital switching system is in the pre-cutover condition, that is not in a fully tested and operative configuration to provide telephone service to the subscribers. The step-by-step switching system is on-line and provides active telephone service to subscribers 1 and 2, until cutover of the digital switching system.

Subscribers 1 and 2 are thus connected via double jumpers 5 and 6 respectively, to the connector bank 80. Quiescent operating potentials are applied to each subscriber's line via a line relay 95 connected in series with the break contact 96 of a cutoff relay. When a subscriber is called, the line relay 95 is disconnected by the operation of the cutoff relay and the line is switched through to a battery feed device of a connector or junctor or other similar circuit.

Line verification and ring testing (LVRT) system 60 is connected to both the step-by-step switching system and to the digital switching system. LVRT 60 is a computer controlled test system which is arranged to provide for a number of line verification and ringing tests of the digital switching system before it is put into active service. These tests include: verifying that the subscriber line is free of shorts, grounds or foreign voltages; verifying that the assigned directory number will reach the same subscriber line from either the step-by-step switching system or the digital switching system; and verifying that the assigned directory number will result in the same type of ringing (frequency and particular side of the line) to be applied by the digital switching system as does the step-by-step switching system. When these functions have been successfully tested on each of the subscriber lines, the digital switching system may be placed into operational service and the step-by-step switching system may be removed from service.

A line verification and ring testing system such as LVT-LRT system, model numbers 730 and 725, manufactured by Porta Systems of Syosset, New York, may be equipped to provide the functions as mentioned above.

LVRT system 60 tests the connection from subscriber 1 to the digital switching system. In the pre-operational configuration, the digital switching system has operated relay 11 to connect both subscribers 1 and 2 to other circuitry which serves to open circuit subscribers 1 and 2 from the switching network 30.

In order to test the line of subscriber 1 only, a unique path must be established through the digital switching system. The release of relay 11 to its normally open condition will connect both subscribers 1 and 2 to the switching network 30. Since only the line of subscriber 1 is to be tested, processor 40 instructs the digital switching network 30 to operate a test relay having contacts 25 to disconnect subscriber 2 from the switching network and connect the subscriber to the test bus, as if, the access is a test access. At the same time, processor 40 via digital switching network 30 operates relay 11 to its normally closed condition for connecting both subscribers 1 and 2 through contacts 12 and 13 toward the switching network 30. Subscriber 1 is now connected through break contact 12, line circuit 20 to the digital switching network 30. Subscriber 2 is connected via break contact 13 and make contact 25 to the test bus. As a result, subscriber 1 has been isolated from subscriber 2 for testing purposes via the network 30 while at the same time both subscribers 1 and 2 retain an operational access to the step-by-step switching system.

LVRT system 60 initiates a test access to the required subscriber terminal of the step-by-step switching system via an incoming test trunk through distributor 90 and test connector 85. The LVRT system 60 outpulses the directory number of subscriber 1, since this is the line to be tested. The four terminating digits of the directory number are used for this purpose. Upon access to the subscriber 1, terminals of the test connector cutoff relay is operated to operate break contact 96, thereby disconnecting line relay 95 from the connection. LVRT system 60 is now connected to the line subscriber 1 via this metallic test access path. LVRT system 60 connects a self-contained test circuit to the line of subscriber 1 through this metallic test access. This test circuit detects foreign potentials, a ground connection or electrical shorts on the line of subscriber 1. If these tests are unsuccessful, LVRT system 60 initiates a printout on terminal device 99 indicating the failure.

Upon successful completion of the above mentioned tests, LVRT system 60 connects to a line circuit 50 or a trunk circuit 51 of the digital switching system. LVRT system 60 sends out the seven digit or the four digit number of subscriber 1, for an access via a line circuit 50 or a trunk circuit 51, respectively. Special test programs are resident in the memory of processor 40 of the digital switching system. The access of line circuit 50 or trunk circuit 51 by LVRT system 60 will be treated as a special call, that is a call associated with a pre-cutover line test. Processor 40 instructs the digital switching network 30 to operate relay 11 for its normally closed condition and to operate the test relay of make-break contacts 25 to connect subscriber 2 to the test bus and to disconnect subscriber 2 from battery feed device 26. Battery feed device 22 is connected through contacts 21 and 12 to the line of subscriber 1.

LVRT system 60 connects its detector to the metallic access path previously completed through distributor 90 and test connector 85. This detector determines whether battery feed is applied to the line of subscriber 1 through the step-by-step switching system by the digital switching system.

The battery feed detector should detect 200 ohms to battery on the ring lead of subscriber 1 and 200 ohms to ground on the tip lead. If desired, LVRT system 60 may cause the digital switching system to apply a specific tone for detection through the step-by-step switching system. An unsuccessful detection of battery feed results in a printout on terminal device 99 by LVRT system 60.

For a successful detection of battery feed, LVRT system 60 will transmit a momentary on-hook signal through line circuit 50 or trunk circuit 51 to the digital switching network 30. The test programs of processor 40 interpret this signal as an instruction to apply ringing to the line of subscriber 1. The on-hook signal is applied for a duration of approximately 200 milliseconds. Switching network 30 will cause a ringing signal to be applied to the line of subscriber 1 in accordance with the data base characteristics stored in the memory of processor 40. This ringing will be transmitted through contacts 21 and 12 to the line of subscriber 1. The ringing signal presence is verified by being transmitted via test connector 85 and distributor 90 to the LVRT system 60.

LVRT system 60 connects a ringing sensor to the line of subscriber 1 via the metallic access path through the step-by-step switching system. The ringing sensor determines the type of ringing signal that was applied by the digital switching system. The processor of LVRT system 60 determines whether the proper ringing frequency has been applied and whether it has been applied to the appropriate side of the line (tip or ring lead). The ringing sensor employed by LVRT system 60 is of low impedance, so that it will effectively shunt the telephone instrument of subscriber 1. As a result, subscriber 1 will not detect any annoyance ringing. The detected ringing characteristics will be stored for later comparison.

Next, LVRT system 60 sends an on-hook (disconnect) signal to the switching network 30 through to the line circuit 50 or the trunk circuit 51. Switching network 30 will remove the applied ringing signal and operate relay 11 to disconnect the digital switching system from the line of subscriber 1.

Then, LVRT system 60 outpulses the directory number of subscriber 1 into the step-by-step switching system. Connection to the line of subscriber 1 is established through a regular subscriber access via line circuit 70, line finder 71, selector 72 and connector 80. Normally, connector 80 would find the line of subscriber 1 busy and return busy tone to LVRT system 60, since prior connection has been established via the metallic access path through distributor 90 and test connector 85. To prevent this condition a bridge cutoff condition is established as described below. The bridge cutoff capability is conventionally used to permit operators at a local test desk to connect a line relay to a line under test and thereby initiate a call for service or an "in-test." Such equipment is well known in the telephone art. A typical system is described in Automatic Electric Company Bulletin 815, titled "The Test and Verification Switch Train." Before LVRT system 60 dials the last digit of subscriber 1, the bridge cutoff is operated removing busy guard from the connector 80. Connector 80 will find the line of subscriber 1 idle and extend ringing to the line.

Since a ringing sensor is connected to the line of subscriber 1 through distributor 90 and test connector 85, the ringing signal is returned to LVRT system 60. The ringing frequency and its application to a particular side of the line will be detected and recorded as mentioned above.

LVRT system 60 may cause the ringing information of both the digital switching system and the step-by-step switching system to simply be printed on terminal device 99. LVRT system 60 may alternatively compare the ringing characteristics of each switching system and print any discrepancy on terminal device 99. LVRT system 60 disconnects all accesses to the step-by-step switching system and digital switching systems. Line verification and ring testing of the line of subscriber 1 is completed and similar testing of each of the other subscriber lines, to be cut over into service on the digital switching system, may proceed.

Although the preferred embodiment of the invention has been illustrated, and that form described in detail, it will be readily apparent to those skilled in the art that various modifications may be made therein without departing from the spirit of the invention or from the scope of the appended claims.

What is claimed is:

1. In a pre-cutover switching configuration, an arrangement for single line testing comprising:
   at least first and second switching system subscribers;
   a first switching system connected to said first and second switching system subscribers, said first switching system being operated to connect said first and second subscribers to any switching system subscribers;
   a second switching system connected to said first and second switching system subscribers, said second switching system being in an untested condition, said second switching system comprising:
   a switching network connected to said first and second subscribers;
   first means for switching connected to said first and to second subscribers, said first means for switching being operated to simultaneously open circuit said connection of said first and second subscribers to said switching network, said first means for switching being normally operated to simultaneously maintain said connections of said first and second subscribers to said switching network;
   second means for switching connected between said switching network and said first means for switching, said second means for switching being operated to connect said first subscriber to a test interface bus, said second means for switching being normally operated to maintain said connection of said first subscriber to said switching network; and
   third means for switching connected between said switching network and said first means for switching, said third means for switching being operated to connect said second subscriber to said test interface bus, said third means for switching being normally operated to maintain said connection of said second subscriber to said switching network; and
   processor means connected to said switching network;
   said arrangement for single line testing further comprising:
   said first means for switching initially operated to open circuit said first and said second subscribers from said second and third means for switching;
   means for testing connected to said first switching system and to said switching network of said second switching system, said means for testing being operated to request connection to said first switching system subscriber via said first and said second switching systems;
   said processor means being responsive to said request of said means for testing to operate said first means for switching for simultaneously connecting said first and second subscribers to said switching network and said processor means being further responsive to said means for testing to operate said third means for switching for connecting said second subscriber to said test interface bus; and
   said first subscriber being connected to said means for testing through said first means for switching, said second means for switching and said switching network.

2. An arrangement for single line testing as claimed in claim 1, said second means for switching including:
- a make-break relay having a make and a break contact;
- said make contact being operated to connect said first subscriber to said test interface;
- a battery feed device connected to said first subscriber via said break contact; and
- said break contact being operated to open circuit said subscriber from said battery feed device.

3. An arrangement for single line testing as claimed in claim 1, said third means for switching including:
- a make-break relay having a make and a break contact;
- said make contact being operated to connect said second subscriber to said test interface;
- a battery feed device connected to said first subscriber via said break contact; and
- said break contact being operated to open circuit said subscriber from said battery feed device.

4. An arrangement for single line testing as claimed in claim 1, wherein said connection of said means for testing to said switching network includes a line circuit.

5. An arrangement for single line testing as claimed in claim 1, wherein said connection of said means for testing to said switching network includes a trunk circuit.

6. An arrangement for single line testing as claimed in claim 1, wherein said switching network includes a digital switching network.

7. An arrangement for single line testing as claimed in claim 1, said means for testing including:
- line verification and ring testing system means; and
- data terminal means connected to said line verification and ring testing system means, said data terminal means operated in response to said line verification and ring testing system means to printout line verification and ring testing information for each of said plurality of subscribers.

* * * * *